Patented Sept. 8, 1925.

1,552,568

UNITED STATES PATENT OFFICE.

HARLEY W. RHODEHAMEL AND ELMER H. STUART, OF INDIANAPOLIS, INDIANA, ASSIGNORS TO THE ELI LILLY & COMPANY, OF INDIANAPOLIS, INDIANA, A CORPORATION OF INDIANA.

COMPOUND OF HALOGEN ACIDS WITH 2-PHENYL-6-METHYL QUINOLINE 4-CARBOXYLIC ACID AND ESTERS THEREOF.

No Drawing. Application filed May 14, 1921. Serial No. 469,635.

*To all whom it may concern:*

Be it known that we, HARLEY W. RHODEHAMEL and ELMER H. STUART, citizens of the United States, residing at Indianapolis, in the county of Marion and State of Indiana, have invented new and useful Compounds of Halogen Acids with 2-Phenyl-6-Methyl Quinoline 4-Carboxylic Acid and Esters Thereof, of which the following is a specification.

Our invention relates to the previously unknown combinations of halogen acids with 2-phenyl 6-methyl quinoline 4-carboxylic acid and esters thereof. Among the esters of 2-phenyl 6-methyl quinoline 4-carboxylic acid which may be used for the preparation of these halogen-acid compounds are the propyl and the normal butyl esters which may be prepared by boiling the acid with an excess of the corresponding anhydrous alcohol in the presence of dry hydrochloric acid. The propyl and normal butyl esters crystallize from alcohol in colorless rectangular prisms melting at 82° C. and 64° C. respectively. They are readily soluble in boiling alcohol and in acetone, but are almost insoluble in water.

These halogen-acid compounds may be represented by the following structural formula, in which X represents a hydrogen atom or any hydrocarbon radical which combines with 2-phenyl 6-methyl quinoline 4-carboxylic acid to produce an ester thereof, and Y represents an atom of a halogen:

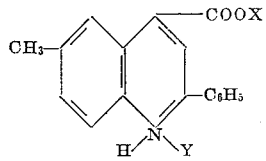

The compounds can be prepared by treating 2-phenyl 6-methyl quinoline 4-carboxylic acid or any of its esters with a halogen acid, preferably an excess thereof, and then drying. They can also be prepared by dissolving the 2-phenyl 6-methyl quinoline 4-carboxylic acid or any ester thereof in alcohol, acetone, or other suitable organic solvent, and then treating this solution with a molecular proportion of a halogen acid; the halogen compound crystallizes from the solution and is then filtered off and dried.

Thus to produce the hydriodide of the ethyl ester, this ester of 2-phenyl 6-methyl quinoline 4-carboxylic acid is treated with hydriodic acid in either of the foregoing ways.

2-phenyl 6-methyl quinoline 4-carboxylic acid hydriodide forms orange yellow crystals which melt at 268.5° C. The corresponding hydrobromide and hydrochloride form lemon yellow crystals melting at 289° C. and 254.5° C. respectively.

2-phenyl 6-methyl quinoline 4-carboxylic acid ethyl ester hydriodide forms orange colored crystals which melt at 177° C. The hydrobromide of this ethyl ester forms yellow crystals which melt at 176° C. The hydrochloride and the hydrofluoride of the ethyl ester occur in lemon yellow crystals which melt at 171° C. and 170°–172° C. respectively.

2-phenyl 6-methyl quinoline 4-carboxylic acid propyl ester hydriodide forms orange colored crystals which melt at 164° C. The hydrobromide and hydrochloride of this propyl ester form lemon yellow crystals melting at 170° C. and 148° C. respectively.

The hydriodide of the normal butyl ester of 2-phenyl 6-methyl quinoline 4-carboxylic acid forms orange colored crystals which melt at 158° C. The hydrobromide and hydrochloride of this normal butyl ester form lemon yellow crystals melting at 123°–126° C. and 118° C. respectively.

We claim as our invention:

1. A compound represented by the following structural formula:

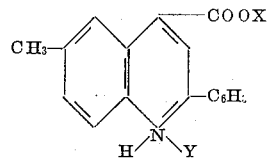

in which X represents a hydrogen atom or any hydrocarbon radical which combines with 2-phenyl 6-methyl quinoline 4-carboxylic acid to produce an ester thereof, and Y represents an atom of a halogen.

2. A compound of a 2-phenyl 6-methyl quinoline 4-carboxylic compound and a halogen acid.

3. A compound of 2-phenyl 6-methyl quinoline 4-carboxylic acid ethyl ester and a halogen acid.

4. The hydriodide of a 2-phenyl 6-methyl quinoline 4-carboxylic compound.

5. The hydriodide of 2-phenyl 6-methyl quinoline 4-carboxylic acid ethyl ester.

6. A compound of an ester of 2-phenyl 6-methyl quinoline 4-carboxylic acid and a halogen acid.

7. The hydriodide of an ester of 2-phenyl 6-methyl quinoline 4-carboxylic acid.

8. The new substances, which contain the radicle which may be represented by the following structural formula:

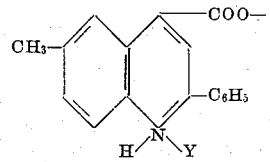

in which Y represents an atom of a halogen.

9. The new substances, which contain the radicle which may be represented by the following structural formula:

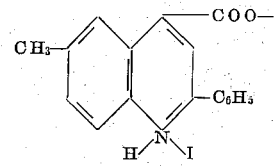

In witness whereof, we have hereunto set our hands at Indianapolis, Indiana, this 10th day of May, A. D. one thousand nine hundred and twenty one.

HARLEY W. RHODEHAMEL.
ELMER H. STUART.